United States Patent [19]

Mizzi

[11] Patent Number: 4,990,725

[45] Date of Patent: Feb. 5, 1991

[54] DEVICE FOR LOCATING THE UNKNOWN POSITION OF AN ELECTRICAL CONDUCTOR BELONGING TO A SET OF SEPARATE CONDUCTORS AND A TOUCH SENSITIVE PANEL COMPRISING SUCH DEVICES

[75] Inventor: Francois Mizzi, La Celle Saint Cloud, France

[73] Assignee: Aid 3 Group Ltd., London, England

[21] Appl. No.: 367,687

[22] Filed: Jun. 19, 1989

[30] Foreign Application Priority Data

Jul. 13, 1988 [CH] Switzerland ............... 2673/88

[51] Int. Cl.[5] ............................................. G08C 21/00
[52] U.S. Cl. ................................... 178/18; 178/20
[58] Field of Search ................. 178/79, 18, 19, 20

[56] References Cited

U.S. PATENT DOCUMENTS 4,570,149 2/1986 Thornburg et al. .............. 178/20 X

FOREIGN PATENT DOCUMENTS 0134853 3/1985 European Pat. Off. .
2046450 11/1980 United Kingdom .

OTHER PUBLICATIONS

Patent Abstract of Japan, vol. 7, No. 192, (P-218), (1337), Aug. 23, 1983.

Primary Examiner—Stafford D. Schreyer
Attorney, Agent, or Firm—Cushman, Darby & Cushman

[57] ABSTRACT

The device locates the position x of the point of connection of one of the electric conductors (2) of unknown ohmic values, connected to unknown separate points of a collecting resistor ($R_1$) of unknown but constant ohmic value per unit length, to which a standard resistor ($R_e$) is also connected whose ohmic value is a known optimal multiple (k) of that of $R_1$. The superposition of two such devices, separated by small rods of elongated form, may serve to create a dependable and inexpensive opaque or transparent panel allowing the locating of the position (x, y) of the one of its points as soon as a slight pressure is exerted on this point.

14 Claims, 3 Drawing Sheets

DEVICE FOR LOCATING THE UNKNOWN POSITION OF AN ELECTRICAL CONDUCTOR BELONGING TO A SET OF SEPARATE CONDUCTORS AND A TOUCH SENSITIVE PANEL COMPRISING SUCH DEVICES

FIELD OF THE INVENTION

Various devices are known allowing the formation of signals characteristic of the position of a point on a surface, a point on which a pressure, for example, of the finger, is exerted.

These devices, called "touch sensitive", form "tactile digitisers" which may serve for input of all kinds of alphanumeric or graphic information; they are called "panels" or membranes. When these panels are produced using transparent materials, they may be used as a covering for various types of screens.

BACKGROUND OF THE INVENTION

Among the many embodiments of such devices proposed to date, the most accurate are those incorporating two pluralities of conductive tracks, the tracks of each set being parallel and those of each plurality being perpendicular to those of the other plurality. These tracks are disposed face to face on an individual support for each plurality of tracks, one of these supports being a flexible membrane, and are maintained at a spacing from those of the other plurality by a number of spacing elements interspaced between the membranes. The tracks of one of the two pluralities are capable of being brought into momentary contact with the tracks of the other plurality by localised deformation of the flexible membrane in its portions located between these spacing elements.

Among the most recent documents dealing with a structure of this kind, produced with modern materials and by making use of an advanced technology, there may be mentioned, by way of example, European Patent Application No. 0,145,651.

In this document, as also in other previous documents such as Japanese Kokai 57-19476; 57-37909 and 57-37910, as well as the following patent specifications, U.S. Pat. No. 3,304,612, FR No. 2,453,452 and GB No. 2,046,450, the tracks of each of the two pluralities of tracks are attached electrically, at a corresponding end, to separate points of a collecting resistor specific to each plurality, the ohmic value of this resistor varying linearly along its entire length.

The electrical signal perceived by these collecting resistors when a pressure has been applied to a given point of the flexible membrane of the device which incorporates them, must generally be "processed" by an assembly of complex and delicate electronic and logic circuits, with the quality of the results dependent on, at the same time, both the manner of detection used and the structural characteristics of these circuits.

It is thus, for example in the case of the solution advocated in the document EP No. 0,145,651, that the evaluation of the signal received by the collecting resistors is carried out by a "flip-flop" type device, yielding first of all, information characteristic of the abscissa of the point looked for, then another signal relating to the ordinate of this point, and so on, this mode of operation resulting, for the user, in a perceptible limitation in the speed of repetitive operation of the device.

This time delay is due, to a large extent, to a capacitance effect intervening at the level of the conductive tracks as a result of the intermittent operation of the aforementioned flip-flop device.

SUMMARY OF THE INVENTION

The present invention is directed towards the provision of devices of the type cited above, for example, touch sensitive panels, overcoming in particular the disadvantage noted previously, for the input of information.

Accordingly, it proposes, in the context of a common inventive concept, several embodiments of devices for locating the unknown position of a specific electrical conductor belonging to a set of separate conductors of indeterminate resistivities, in which at least a first point of each conductor of said first set of separate conductors is connected to a respective separate point on a first collecting resistor of constant ohmic value per unit length, whose For example one embodiment includes a standard resistor having an end connected to a point on the first collecting resistor. Also included is a first means for determining the value of the potential difference appearing between the ends of the first collecting resistor and that appearing between the ends of the standard resistor when the specific electrical conductor and a second end of the standard resistor are brought to respective potentials of different value from one another. There is also provided an other means for determining the value of the distance separating the specific conductor of unknown position from an origin point, predefined on the first collecting resistor, on the one hand as a function of a constant characteristic of the value of the standard resistor and of the specific resistance per unit length of the collecting resistor, and on the other hand, from the values of the potential differences determined by the first means.

In a second embodiment, the standard resistor may be formed by at least a part of the length of a third resistor of identical structure to that of the first collecting resistor and extending at a spacing from this first collecting resistor, near to the second ends of the conductors associated with this resistor. Such a device includes a second set of separate conductors, each of which extends between two conductors of the first set of conductors, near to these, the conductors of the second set being connected individually to separate points of the third resistor. Moreover, the first means is adapted in such a manner as to enable the value of the potential difference appearing between the ends of the first collecting resistor and that appearing between the ends of the third resistor to be determined when one of the ends of the first collecting resistor and the opposite end of the third resistor are brought to respective reference potentials of different value from resistor to resistor, and an electrical contact is established between the conductor of unknown position of the first set of conductors and an adjacent conductor belonging to the second set of conductors.

In still another embodiment, the conductors of the first set of separate conductors may each be connected individually at a second point to a respective corresponding separate point of a second collecting resistor of identical structure to that of the first collecting resistor. Further, each end of the standard resistor may be connected to a corresponding point of a respective collecting resistor, electric connections of negligible resistive value compared with the value of said resistors connecting the corresponding ends of the collecting resistors.

The invention also relates to a touch sensitive panel, comprising two of these devices for the input of information carried by an individual substrate for each device.

For example, the device provides for at least one of the substrates being of a flexible and elastic material, with the substrates being superpositioned and disposed in such a way that the conductors of each substrate form a group crossing at a spacing the conductors of the other group belonging to the second substrate. The device further provides for each conductor of a group crossing over once and only once all of the conductors of the other group, and spacing elements of the substrates maintaining the conductors of each substrate spaced from those of the other substrate in a rest position of the substrate of flexible material. In the device each conductor of this substrate is capable of being brought into contact with at least one conductor of the other substrate by elastic deformation of the flexible substrate caused by a localized pressure exerted on this in the desired region for contact.

By means of this kind of devices, a signal characteristic of the unknown position of the conductor concerned is in effect obtained by the required measurement in a manner which is very precise and easy to exploit. Moreover, in the case of a panel of the above type, the result of this measurement may be obtained simultaneously for the one and for the other of the two co-ordinates used to define the position of any point of the panel on which a pressure may have been exercised.

Making use of such a panel is not therefore subject to any perceptible limitation in the speed of its repetitive operation by alternating pressure of a user's fingers.

BRIEF DESCRIPTION OF THE DRAWINGS

The attached drawings represent, very schematically and by way of example, different embodiments and variants of the subject of the present invention.

DETAILED DESCRIPTION OF THE INVENTION

Figure 1:
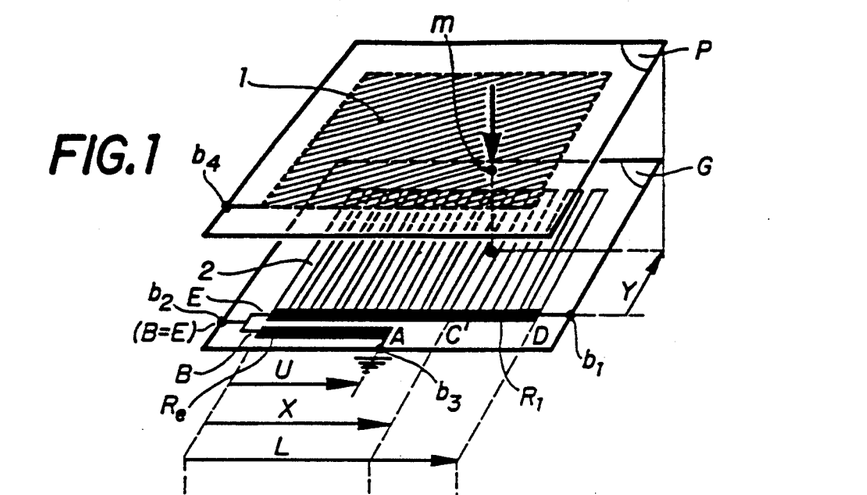
FIG. 1 shows, in perspective, a data entry panel incorporating a first embodiment of the device according to the invention.

FIG. 1 represents, very schematically, a panel intended for input of values of abscissae x. It comprises a first flexible substrate P, for example a thin film of polyester or of polycarbonate or of very thin annealed glass, whose usual thickness lies between 100 and 300 $\mu$, for example of the order of 150 $\mu$, and whose lower surface is coated with an electrically conductive layer 1, for example of ITO (transparent) or of carbon (opaque).

The panel shown comprises in addition, deposited on an insulating substrate G, for example of glass, a plurality of parallel conductors 2, formed for example of ITO or of carbon. The plurality of parallel conductors 2 can be deposited on the substrate by any known technique, and each conductor has a width of several tens of $\mu$ to several mm for a thickness of several tens of Å for example.

On the substrate G and between certain conductors 2, spacing elements S (FIGS. 1a and 1b) are disposed, obtained for example by silk-screen printing, these being in the form of elongated rods whose dimensions may be of the order of 100 to 1000 $\mu$ for their length, 50 to 500 $\mu$ for the width and 1 to 200 $\mu$ for their thickness. In a general manner, their thickness should be at most equal to the width, this latter being itself at most equal to the length of the rod. These rods may be produced in polyethylene, for example by silk-screen printing, in particular in the form of semi-cylinders.

Figures 1A, 1B, 1C:
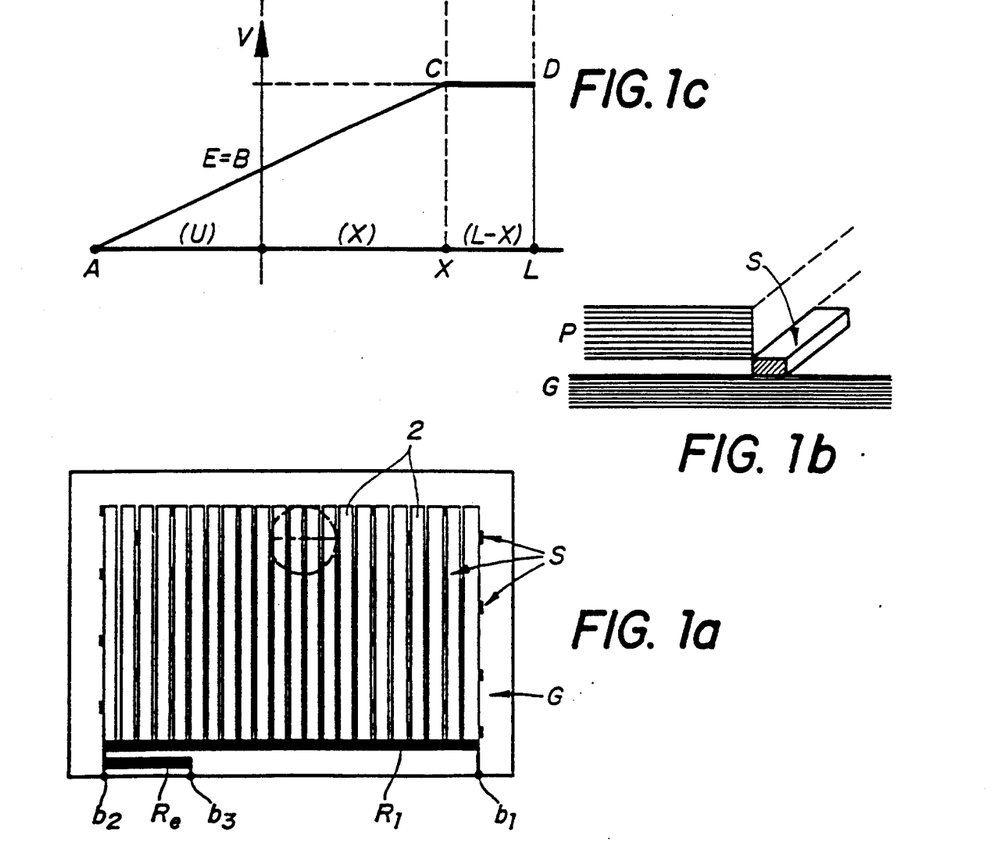
FIG. 1a is a detailed view of FIG. 1 to a larger scale.
FIG. 1b is a sectional view of another detail of FIG. 1.
FIG. 1c is an explanatory diagram.

As may be seen in detail in FIG. 1b, these rods serve to keep the substrate P and its conductive coating 1 spaced from the conductors 2 of the substrate G. Accordingly, the rods S are spread out over the entire substrate G and are disposed in rows between the conductors 2 at a spacing from one another which may be between 1,000 $\mu$ and 10,000 $\mu$ depending on the flexibility of P.

Due to this particular structure of the rods, which may be noted for example in FIG. 1b in which they are in particular in elongate form, the width of which is greater than the thickness, it is possible to avoid, in the assembled position of the panel, the occurrence of the disadvantage encountered in the previous technique making use of spacing elements formed by very thin protrusions, which produce an actual marking of the flexible membrane which they support when this is pressed by means of a soft body such as the finger of a user. In such a case, these thin protrusions produce the effect of a "tent peg", this expressing itself as a permanent deformation of the membrane, which becomes more and more pronounced according as repeated pressure is effected by the finger of the user on them. This results in the production of short circuits by undesirable localized contacts, independent of any operation of the panel, between the conductor or the conductors carried by the flexible membrane and the underlying conductive tracks covering the lower substrate of the panel.

At their lower end (see drawing FIG. 1a), the conductors 2 are electrically connected to a collecting resistor $R_1$ extending along the entire length of the network formed by the conductors 2, the ohmic value of this resistor increasing in a strictly linear manner from one end of the resistor to the other. This resistor may be formed by a layer of carbon for example, of a width much greater than that of its contact regions with the conductors 2, for example from several hundreds of $\mu$ to several mm, and a thickness of the order of a micron for example. The right hand end of the resistor $R_1$ is connected to a measurement terminal $b_1$ by a conductor of negligible resistance, for example a layer of silver. The left hand end of the resistor $R_1$ is connected, likewise by a silver conductor, to the left hand end of a standard resistor $R_e$. The standard resistor $R_e$ can be formed either by an electrical resistor of conventional structure for example, or, as for the resistor $R_1$, by for example a layer of carbon, the ohmic value of which varies linearly with the length of the layer and the specific resistivity of which is identical to that of the resistor $R_1$.

The left hand end and the right hand end of the resistor $R_e$ are connected by silver connections to terminals $b_2$ and $b_3$ respectively. The length U of the resistor $R_e$ is determined according to the length L of the resistor $R_1$. Advantageously it will be equal to one-half of L. In practice, it should not be less than 0.2 times the length L for a desired accuracy of acceptable value. The technical reasons for this choice will be indicated subsequently.

The panel described (FIG. 1) is used by connecting the terminal $b_3$ of the resistor $R_e$ to earth and by connecting a terminal $b_4$, to which the conductive layer 1 of the substrate P is connected, to a voltage source, for example of a value of 5 volts.

If a pressure is then exerted on the point m of the substrate P, of sufficient intensity to bring into contact the conductive layer 1 of this substrate and the conductor 2 of the substrate G passing under this point m, this conductor will be brought to a voltage substantially corresponding to the voltage of the terminal $b_4$.

On the resistor $R_1$, there will be a corresponding voltage C, at a point c' of unknown abscissa x with respect to the left hand end of the resistor $R_e$, a voltage which will be found in its entirety at the right hand end of the resistor $R_1$ (terminal $b_1$), since no current leaves at this terminal.

When the specific restivity per unit length of the resistors $R_1$ and $R_e$ is identical and the ohmic value of these resistors varies linearly, the voltage decreases linearly along these resistors from the value C to a zero value, the terminal $b_3$ being grounded (voltage conventionally called A).

The voltage at the left hand end of the resistor $R_1$ (voltage E), being equal to that of the left hand end of the resistor $R_e$ (voltage B), will thus have an intermediate value lying between the values C and A, as is to be seen clearly in FIG. 1c, which shows the variation of voltage at different points on the resistors $R_1$ and $R_e$.

If x is the unknown abscissa of the point m of the panel, U the length of the standard resistor $R_e$, and L the length of the collecting resistor $R_1$, it is seen that the voltage drops from the value C=D to the value A=0 over a total resistor length equal to U+x, while the voltage drops from the value B, existing at the terminal $b_2$, to a zero value at the terminal $b_3$.

Referring to the diagram of FIG. 1c, it is seen that $$\frac{x+U}{D-A} = \frac{U}{E+A} \text{ or, again, } \frac{x}{U} = \frac{D-E}{B-A} \text{ (where } B = E)$$

$$\frac{x}{L} = k \cdot \frac{D-E}{B-A} \text{ where } k = \frac{U}{L} \text{ known.}$$

Thus, the abscissa of the point m may be obtained from, on the one hand, the difference of the voltages existing at the ends of the resistors $R_1$ (collecting) and $R_e$ (standard), a difference which may be determined by any suitable means, and, on the other hand, the ratio between the resistors $R_1$ and $R_e$. The value x/L may be obtained by connecting the terminals $b_1$, $b_2$ and $b_3$ to various electronic calculating means.

The formula quoted above is only true on condition that the collecting resistor and the standard resistor both have the same specific resistivity per unit length: the value of x/L thus obtained should therefore be multiplied by an adjustment factor taking account of possible differences in cross-section and resistivity which may exist between the two resistors.

It is convenient, at this point, to note that the accuracy of the result obtained in this manner depends on the length U of the standard resistor $R_e$ in relation to the length L of the collecting resistor $R_1$. This accuracy will however be different depending on the position occupied by the point M on the programming panel.

It may in effect be demonstrated that the error $\delta$ in the ratio x/L, when x varies from O to L, is a linear function of x such that $$\delta \frac{x}{L} = k \cdot \frac{|U-x|}{U^2} \cdot \epsilon \text{ where } k = \frac{U}{L} \text{ known}$$

in which $\epsilon$ is the absolute error of the lengths U and L $$\epsilon = \delta U = \delta L.$$

The value of $$\delta \cdot \frac{x}{L}$$

becomes zero when x=U; it is equal to $\epsilon/L$ for x=0 or x=2U.

Thus the average accuracy will be optimal for U=L/2, that is to say when the standard resistor $R_e$ has a length U equal to half the length L of the resistor $R_1$, since the maximum spread of error variations is thus minimized.

$$\delta \cdot \frac{x}{L}$$

for x between O and L.

In practice, depending on the accuracies acceptable for x/L, standard resistors $R_e$ having lengths U not less than 0.2 times the length L of the collecting resistor $R_1$ may be accepted.

Figures 2, 3, 4:
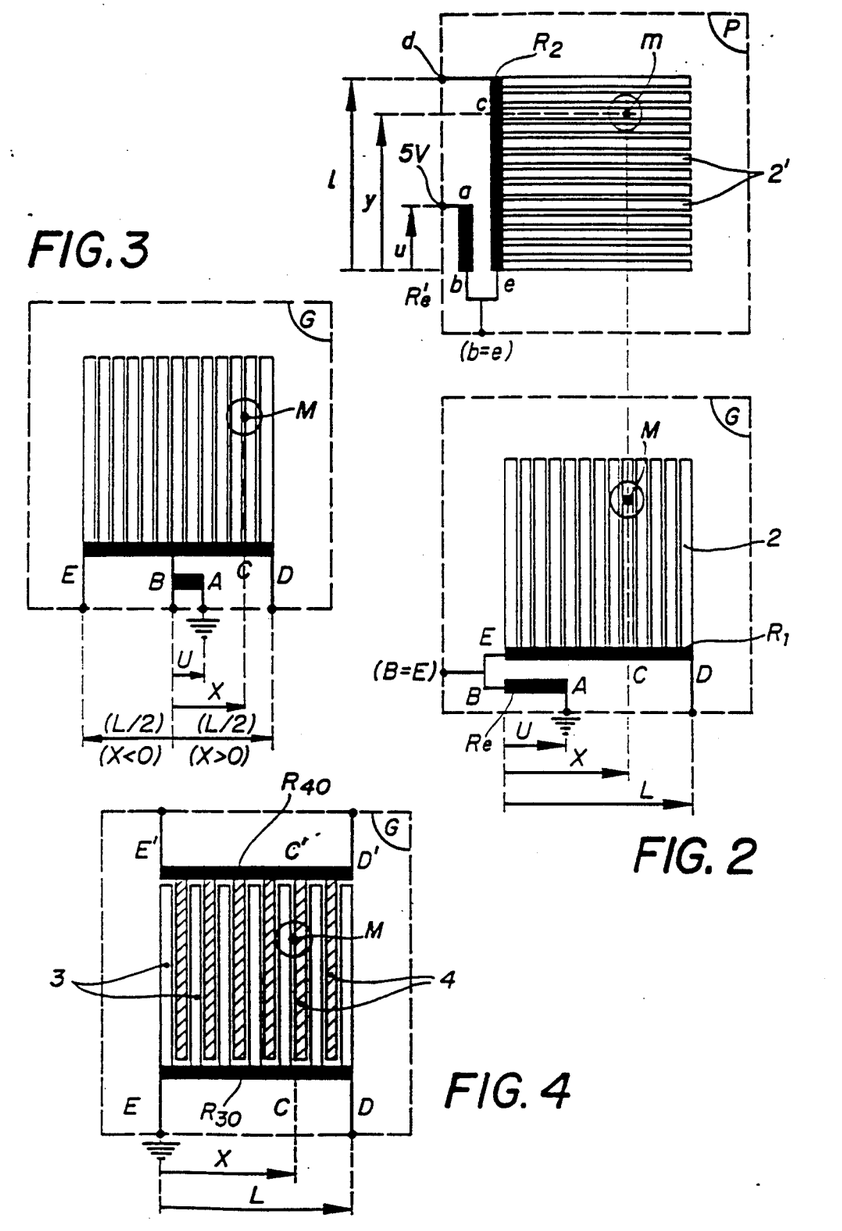
FIGS. 2 to 7 relate to various embodiments of the device according to the invention.

The embodiment of FIG. 2 is distinguished from that of FIG. 1 essentially in that the panel is formed by assembly of two substrates P and G in which the upper substrate P, which it is to be remembered is formed by a sheet of flexible material, itself also carries a set of parallel conductors 2' connected, at one end, to a collecting resistor $R_2$, with which a standard resistor $R'_e$ is associated. As is to be seen in the drawing, the conductors 2' extend perpendicularly to the conductors carried by the substrate G. Spacing elements identical to those described with reference to FIG. 1a and disposed, for example, on the lower surface of P in the same manner, ensure the mutual positioning of the two substrates P and G, and, as a result of this, that of their respective network of conductors.

In this embodiment, it is the free end of the measuring resistor $R'_e$ which is brought to the reference voltage, for example 5 volts, while the free end of the resistor $R_e$ of the substrate G will be grounded.

Use of the panel illustrated would of course give identical results if the resistor $R'_e$ was grounded and if the resistor $R_e$ was brought to the voltage of 5 volts.

In the above conditions, the value of the abscissa x of any point M on the panel to which a user has applied his finger will be given, as in the case of the embodiment of FIG. 1, by the relationship $$\frac{x}{L} = k \cdot \frac{(D-E)}{(B-A)} \text{ where } k = \frac{U}{L} \text{ known}$$

Similarly, the value of the ordinate y will be $$\frac{y}{l} = k' \cdot \frac{(d-e)}{(b-a)} \text{ where } k' = \frac{u}{l} \text{ known}$$

in which k' is the known ratio (comprised in the panel) between the length u of the standard resistor R'$_e$ and the length l of the collecting resistor R$_1$.

The accuracy of measurement of the device illustrated will be optimal if the lengths U and u of the resistances R$_e$ and R'$_e$ and, as a result of this, their ohmic values, are chosen equal to half the lengths L and l of the collecting resistors, respectively R$_1$ and R$_2$, and thus the ohmic value of these. In practice, depending on the acceptable accuracy, the panels may be produced with standard resistors of lengths not less than 0.2 times the lengths of the respective collecting resistors.

It may be noted that it is not necessary for the standard resistors R$_e$, R'$_e$ respectively, of which use was made in the embodiments of FIGS. 1 and 2 described, to be necessarily connected to one end of the corresponding collecting resistor R$_1$, R$_2$ respectively.

In fact, and according to an essential feature of the present invention, the standard resistor may be connected to any point on the length of the collecting resistor which is associated with it, it being understood that the measured value, abscissa or ordinate, of the distance of the point of activation of the panel will be from the point of connection of the standard resistor to the collecting resistor, this point requiring to be considered as being the origin of the measuring system. The result of this may be positive or negative, which will indicate whether the point whose co-ordinates are being looked for is situated, for example, to the right or to the left of the origin (in the drawing). FIG. 3 illustrates precisely such an embodiment in which the standard resistor is connected to the central point of the collecting resistor.

In such a case it may be shown that as beforehand, the ratio x/L between the distance x between the origin of the measuring system (corresponding to the point of mutual connection of the standard resistor of length U and the connecting resistor of length L/2) and the length L is equal to twice the quotient of the voltage difference measured at the ends of the collecting resistor (D−E) by the voltage difference measured at the ends of the standard resistor (B−A), the whole multiplied by the known ratio $$k = \frac{U}{L}$$

$$\frac{x}{(L/2)} = 2 \cdot \frac{x}{L} = 2k \cdot \frac{(D-E)}{(B-A)} \left( \text{where } k = \frac{U}{L} \right)$$

The notations of FIG. 3 are referred to for more details. It will be seen that this assembly doubles the sensitivity of measurement of X.

As beforehand, the optimum length U of the standard resistor will be equal to half the length used, L/2, of the collecting resistor, that is to say U=L/4. In practice, depending on the accuracy acceptable, this standard resistor may have a length U not less than 0.1 times the length L of the collecting resistor.

The embodiment of FIG. 4, in which only the lower substrate G of a panel has been shown, has two sets of parallel conductors 3 and 4 interleaved two by two without contact from set to set, but connected to individual collecting resistors R$_{30}$, for the conductors 3, and R$_{40}$, for the conductors 4. The resistor R$_{30}$ and R$_{40}$ are of the same length, of the same specific resistivity per unit length and of a value varying linearly over their entire length : they thus have an overall ohmic value identical from resistor to resistor.

They may be produced, as in the case of the embodiments already illustrated, by a coating of carbon, for example deposited on the actual surface of the substrate carrying the conductors 2 and 3, a substrate which, it will be recalled may be formed of glass or of a plastics material, etc. of a density or flexibility varying according to the requirements.

Use of this embodiment is effected by connecting to earth for example the left hand end of the resistor R$_{30}$ and by applying a voltage, for example of 5 volts, to the right hand end of the resistor R$_{40}$. If a conductor 4 near to the point M and the adjacent conductor 3 are connected electrically by suitable means, then since the value of the current flowing between the right hand end of the resistor R$_{40}$ and the point M is the same as that flowing between this same point and the left hand end of the resistor R$_{30}$, it may be shown that the value x of the abscissa of the point M will be equal to $$\frac{x}{L} = \frac{(D-E)}{(D-E)+(D'-E')}$$

a relationship in which

E is the potential at the left hand end of the resistor R$_{30}$,

E' is the potential at the left hand end of the resistor R$_{40}$,

D is the potential at the right hand end of the resistor R$_{30}$, and

D' is the potential at the right hand end of the resistor R$_{40}$.

By analogy with what has already been explained referring in particular to FIGS. 1 and 2, it is seen that in this embodiment, the standard resistor is of a value which is variable with the abscissa of the point M and is formed by the segment of the resistor R$_{40}$ between the point of this resistor to which the conductor 3 connected at this point M is attached, the nearest conductor 4 to which is in turn attached to the resistor R$_{40}$, and the right hand end of this latter to which the voltage of for example 5 volts is applied.

By way of example, it may also be pointed out that the contact at the point M between neighboring conductors 3 and 4 may be produced simply by covering the tip of the user's finger with a conductive covering, which may be formed by a metallic sheet or by a conductive paste. Use may also be made of a pencil having a metallic tip wide enough to embrace and touch two neighboring conductors 3 and 4 at the same time, or of a membrane which becomes locally conductive in the region where it is compressed.

Figures 5, 6, 7:
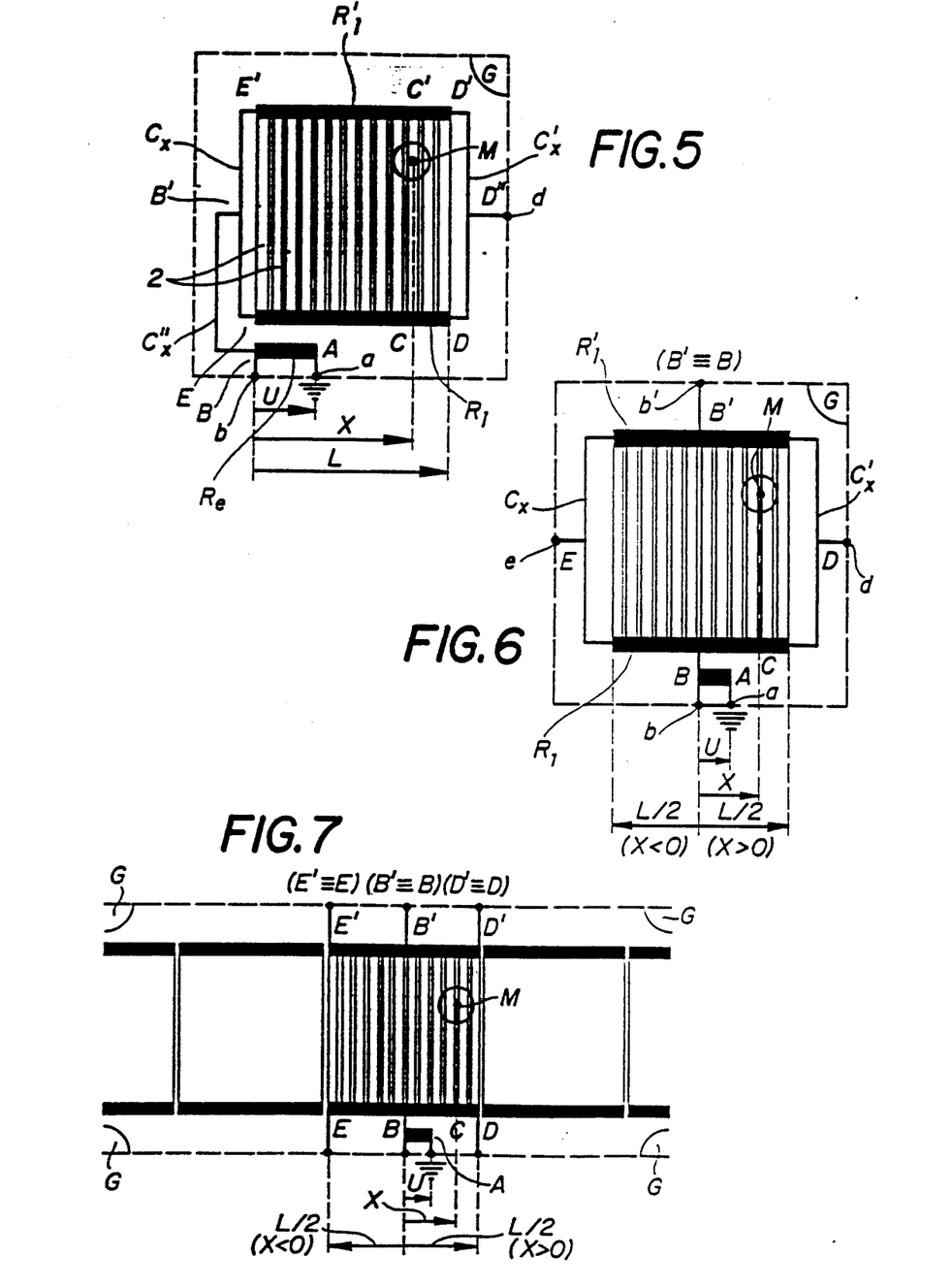

In the embodiment of FIG. 5, the device according to the invention comprises a set of parallel conductors 2 whose ends are attached to separate points of two collecting resistors R$_1$ and R$_1$, respectively, of the same length, of the same overall ohmic value and having an identical and constant specific resistivity per unit length. The corresponding ends of each resistor R$_1$ and R$_e$ are attached two by two by connections c$_x$ and c$_x$', of negligible resistance since they have a linear specific resistivity, for example 1000 times weaker than that of the resistors R$_1$ and R$_1$'. These connections may be formed by painting with silver : the collecting resistors may be produced in the same manner as in the case of the preceding embodiments.

At the mid-length of the connections $c_x$ and $c_x'$, the device shown comprises, on the one hand, a terminal d, for the connection $c_x'$, and, on the other hand, a connection $c_x''$. likewise of negligible resistance, for the connection $c_x$, connecting this latter to the left hand end, in the drawing, of a standard resistor $R_e$. This is also connected at this left hand end to a terminal b and at its other end to a terminal a. The resistors $R_1$ and $R_1'$ have a length L and the resistor $R_e$ a length U. In the case in question, the device described is placed at a zero potential A at the terminal a.

If a potential is applied to the point M of the device described, it follows that the potential at the left hand end of the resistor $R_e$ is equal to the potential existing at the left hand end of the resistors $R_1$ and $R_1'$. The potential at the right hand end of these same resistors is identical from resistor to resistor. It follows from the preceding discussion that the abscissa x of the point M may be obtained from the relationship $$\frac{x}{U} = 2k \cdot \frac{(D-E)}{(B-A)} \text{ where } k = \frac{U}{L} \text{ known}$$

where (D−E) is equal to the voltage difference measurable between the ends of the resistors $R_1$ and $R_1'$ and (B−A) the voltage difference between the ends of the standard resistor $R_e$. It may be seen that this arrangement doubles the sensitivity of measurement of x. The optimal value of U will be U=L/4.

The embodiment of FIG. 6 differs from that shown in FIG. 5 in that the standard resistor $R_e$ is connected to the mid-point of the collecting resistors $R_1$ and $R_1'$, the terminals b and b' being connected by a connection of negligible resistivity, not shown. This connection may be provided in the same manner as the connection $c_x$.

The device shown also has a terminal e at the mid-length of the connection $c_x$ and a terminal d at the mid-length of the connection $c_x'$.

If the terminal a of the standard resistor is brought to a voltage A=0 and the point M to any suitable voltage, greater than 0, the distance between the point of intersection of the conductor 2 passing through this point M with the resistor $R_1$ (of width L) and the left hand end of the resistor $R_e$ (of length U) will be given by the relationship $$\frac{x}{L} = 4k \cdot \frac{(D-E)}{(B-A)} \text{ where } k = \frac{U}{L} \text{ known}$$

where (D−E) is equal to the voltage difference measurable between the terminals d and e, either specifically between the opposite ends of the collecting resistors $R_1$ and $R_1'$ while (B−A) is equal to the voltage difference between the terminals b and a, or that existing between the ends of the standard resistor $R_2$. It may be seen that this arrangement quadruples the sensitivity of measurement of X: in this case the optimal value of U will be U=L/8. As may be seen in FIG. 7, a device of the type described with reference to FIG. 6 may be integrated alongside other similar devices to form a composite panel whose overall accuracy of measurement will be particularly high because the average measurement error may be maintained at its minimum value in each device taken in isolation, the composite unit being of a length corresponding to $1/n^e$ of that of the assembly of the devices of the panel.

It may be noted, at this point, that in a general manner a panel according to the invention may also be formed by the assembly of two devices from among those previously described, even if they have a different structure from device to device. It would for example be possible to combine a device of the type shown in FIG. 1a, carried on a relatively rigid substrate, with a device of the type illustrated in FIG. 5, carried on a flexible substrate, on which the user's fingers may be applied during operation of the panel and the corresponding co-ordinates (x, y) obtained; this flexible substrate will carry a group of conductors (2) oriented perpendicularly to those carried by the rigid substrate, and spacing elements 5 (FIG. 1b) separating the two groups of conductors. Any other combination of devices from among those described would obviously be possible without thereby departing from the scope of the invention.

In the description which precedes and in the drawings to which it refers, it has essentially been a question of devices in which the collecting resistor or the collecting resistors and the standard resistor were both formed on the same substrate and were individually formed by a resistive layer of carbon, preferably having for example a specific resistivity per unit length identical for all of these resistors. In particular, it has been noted that in the case where this resistivity was not identical between the collecting resistors and the standard resistor, it would be necessary to take account of this fact, as will be detailed hereinafter by the introduction of correction coefficients k and $k_1$ directly dependent on the specific type of identity defect (cross-section, resistivity etc.).

It may be recalled first of all that it is possible to avoid these coefficients when, for each device taken in isolation, the specific resistivity per unit length of the standard resistor $R_e$ and that of the collecting resistor $R_1$ are arranged to be identical, since in such a case it will not be necessary to proceed to standardize the collecting resistor $R_1$ of each device as the measurement results obtained with different devices will be identical for all of the devices even if they belong to different manufacturing batches in which this specific resistance is not the same for all of the devices, on condition only that the geometric ratio k of the lengths U/L of the standard resistor $R_e$ and of the collecting resistor $R_1$ be the same for all of the devices. The same applies for the ratio k'=u/l of FIG. 2.

However, if, at the risk of complicating the electric assembly, correction coefficients are accepted, it is not indispensable for the standard resistor to be integral with the device itself; it may very well be carried by a substrate other than that of the remainder of the device of which it is a part. It may also have a composition very different from that of the collecting resistors of the device: it suffices in fact, that its standard value be known with respect to that of the collecting resistor with which there are associated the conductors among which a position (x or y) is required to be determined relative to an origin which may be arbitrarily fixed on this collecting resistor, the corrections required by the choice of this origin being capable of being automatically carried out by the electronic calculating device to which the panel according to the invention would be attached.

Thus according to a variant, it is possible to simplify the production of these panels, formed, as described previously (see FIG. 2) by two superpositioned devices for measuring, respectively, the two co-ordinates x and y; it is sufficient to use only one and the same standard resistor $R_e$ for the assembly of the two superpositioned devices. This may be composed of an electrical resistor of a classic type connected in series with the collecting resistor $R_1$ (see $R'_1$) of one of the two superpositioned devices. The value of this resistor $R_e$ may be between those of the resistors $R_e$ and $R'_e$ previously described for the two superpositioned devices; one will use, for example, a resistor $R_e$ of a value near to $\frac{1}{4}$ of the sum of the collecting resistors $R_1$ of the device measuring X and $R_2$ of the device measuring Y.

Thus it suffices to standardize with respect to $R_e$, these two collecting resistors $R_1$ and $R_2$, by establishing the ratio of the voltage differences measured at the ends of each of these resistors when energized in series with $R_e$.

Let (FIG. 2) $E_o - A_o$ be the voltage difference at the ends of $R_e$ and $D_o - E_o$ that at the ends of $R_1$ in series with $R_e$. The standardizing allows the following value for the coefficient k to be obtained:

$$k = \frac{E_o - A_o}{D_o - E_o}$$

Proceeding in the same manner for the second substrate, the value of k' is obtained:

$$k' = \frac{e_o - a_o}{d_o - e_o}$$

These two standardizing values k and k' characterizing each panel composed of two superpositioned devices may be obtained for example during the manufacturing of the panels or alternatively by means of the electronic calculating device located in the interior of the apparatus which incorporates such a panel, during the initialization procedures for each apparatus. This electronics may be produced in such a manner as to connect in series (only during the standardizing phase) $R_1$ and $R_2$, themselves connected to $R_e$, the connection $R_1$, $R_2$ being suppressed apart from standardizing. In this case, the value $(e_o - a_o)$ being equal to that of $(E_O - A_o)$, one of these two measurements may thus be avoided.

The values looked for, X/L and Y/l, are obtained by the same formulae given before with reference to the embodiments of FIGS. 1c, 2, 3, 5, 6, 7 by replacing the values of the coefficients $k = U/L$ and $k' = u/l$ by the values k and k' given above.

This modification of the expressions for the coefficients k and k' shows that the present procedure comes back to substituting electrical voltage measurements for the mechanical measurements of lengths of corresponding resistors.

According to a final embodiment of the panel according to the invention, this single standard resistor ($R_e$) external to the two devices of the panel may even be suppressed, for its replacement by a reciprocal electrical standardizing of the two collecting resistors $R_1$ and $R_2$ instead of their individual standardizing with respect to $R_e$: $R_1$ serves as a standard resistor for $R_2$ and vice versa.

To do this, $R_1$ and $R_2$ are temporarily connected in series (for the standardizing), then a voltage difference is established between their two free ends, and the two voltage differences obtained at the terminals of the two resistors are measured. This allows calculation of the coefficient k equal to the ratio of the two voltage differences thus measured.

Accordingly, going back to the notation used in FIG. 2 in which it will be accepted, by convention, that $R_e$ and $R'_e = 0$ because they do not exist in this embodiment, then, since the two resistors $R_1$ and $R_2$, connected in series, are traversed by the same current, if the individual linear resistivities of these two resistors are equal to $$\lambda = \frac{\rho_1}{S_1}$$

for the resistor $R_1$ of cross-section $S_1$, and $$\mu = \frac{\rho_2}{S_2}$$

for the resistor $R_2$ of cross-section $S_2$, and if the voltage difference measured at the terminals of these resistors in series is equal to "$D_o - E_o$" for the resistor $R_1$ of length L and to "$d_o - e_o$" for the resistor $R_2$ of length 1, there may be written $$\frac{\lambda \cdot x}{D_o - E_o} = \frac{\mu \cdot y}{d_o - e_o} \qquad \text{(equation 1)}$$

If the series connection of the resistors $R_1$ and $R_2$ is now interrupted and a voltage V is applied to the point e of the resistor $R_2$ while the point E of the resistor $R_1$ is grounded and pressure is exerted on the panel at the point M of abscissa x from E and of ordinate y from e, there may be written $$\frac{\lambda \cdot x}{D - E} = \frac{\mu \cdot y}{d - e} \qquad \text{(equation 2)}$$

where $D - E$ equals the voltage difference measured at the terminals of $R_1$ and $d - e =$ the voltage difference measured at the terminals of $R_2$.

If finally, under the same conditions as above, application of the voltage V to the point d of the resistor $R_2$ is continued but the voltages at the ends D and E of $R_1$ are inverted by grounding the point D while continuing to apply pressure at the same point M of the panel (abscissa and ordinate X and Y respectively), one may write $$\frac{\lambda \cdot (L - x)}{E' - D'} = \frac{\mu \cdot y}{d' - e'} \qquad \text{(equation 3)}$$

in which "$E' - D'$" = the voltage difference measured at the terminals of $R_1$, and "$d' - e'$" = the voltage difference measured at the terminals of $R_2$.

This third equation may be replaced by one of the three other equations obtained by the three other combinations of possible inversions of the ends of $R_1$ and $R_2$. Again let $$Y = \frac{y}{l}, X = \frac{x}{L} \text{ and } K = \frac{D_o - E_o}{d_o - e_o}$$

The quotient of the equations 1 and 2 and of the equations 1 and 3 respectively allows the values of X and Y below to be obtained, all calculations completed, $$X = (D - E) \cdot G \text{ where}$$

-continued $$G = \frac{d' - e'}{(d' - e') \cdot (D - E) + (E - D') \cdot (d - e)}$$

$$Y = K \cdot G \cdot (d - e)$$

It follows from that which precedes that by virtue of this last embodiment, there are obtained values characteristic of the co-ordinates (X,Y) of the point M looked for which are totally independent of the specific linear resistivities of the coatings forming both the resistor $R_1$ and the resistor $R_2$. Accordingly, any imprecision in the cross-sections and/or the resistivities of these coatings, from panel to panel, will not modify in any way the result of the measurements obtained, for a particular point M, on each panel belonging to a series of such panels. This result will thus remain identical whatever panel is used.

The panels described may equally well be opaque as transparent depending on the materials used to produce them. When they are transparent, they may be used to cover viewing screens, for example to select by pressing with the finger all sorts of options displayed on the screen of a computer in the form of alphanumeric and graphic messages, or again to introduce into computers markings which one makes on these panels by means of a stylus or the finger. The use of such panels is not of course limited to the entry of data for computers, but may extend to applications as diverse as the selection of numbers, telephone addresses, the composition of control panels of every kind, etc.

I claim:

1. A device for locating the unknown position of a specific electrical conductor belonging to a set of separate conductors of any indeterminate resistivities, in which at least a first point of each conductor is connected to separate points of a first collecting resistor of constant ohmic value per unit length, said device comprising:
   (a) a standard resistor connected at one of its ends to a point of the collecting resistor,
   (b) first means for determining the value of the potential difference appearing both between the ends of the collecting resistor and between those of the standard resistor when the said electrical conductor and the second end of the said standard resistor are brought to respective potentials of different value from one another,
   (c) other means for determining the value of the distance separating the said conductor of unknown position and an origin point, predefined on the collecting resistor, on the one hand as a function of a constant characteristic of the value of the standard resistor and of the specific resistance per unit length of the collecting resistor, and on the other hand, from the values of the potential differences determined by said first means.

2. A device according to claim 1, the separate conductors being connected individually at a second point to corresponding separate points of a second collecting resistor of identical structure to that of the first collecting resistor, and said standard resistor being connected at one of its ends to a corresponding points of each collecting resistor, and including electric connections of negligible resistive value compared with the value of the said resistors connecting the corresponding ends of the collecting resistors.

3. A device according to claim 1, said standard resistor being connected to one of the ends of the collecting resistor.

4. A device according to claim 1, said standard resistor being connected at the mid-length of the collecting resistor.

5. A device according to claim 1, said separate conductors being carried by a common substrate, and said collecting and standard resistors being each comprised of a resistive ohmic coating formed on the substrate and each having a constant and identical specific resistivity per unit length.

6. A device according to claim 5, said standard resistor being at least equal to 0.20 times that of the collecting resistor.

7. A device according to claim 5, said standard resistor being at least equal to 0.10 times that of the collecting resistor.

8. A device for locating the unknown position of a specific electrical conductor belonging to a first set of separate conductors of indeterminate resistivities, in which at least a first point of each conductor of said first set of separate conductors is connected to a respective separate point on a first collecting resistor of constant ohmic value per unit length, the device comprising
   (a) a standard resistor being formed by at least a part of the length of a resistor of identical structure to that of the first collecting resistor and extending at a spacing from the first collecting resistor, near to the second ends of the separate conductors associated with the first collecting resistor,
   (b) a second set of separate conductors, each of which extends between two conductors of the first set of conductors, near to these, the conductors of the second set being connected individually to separate points of said standard resistor,
   (c) first means for determining the value of the potential difference appearing between the ends of the first collecting resistor and that appearing between the ends of the standard resistor when one of the ends of the first collecting resistor and the opposite end of the standard resistor are brought to respective reference potentials of different value from resistor to resistor, and an electrical contact being established between the conductor of unknown position of the first set of conductors and an adjacent conductor belonging to the second set of conductors, and
   (d) other means for determining the value of the distance separating the position of the electrical contact from an origin point, predefined on the first collecting resistor, on the one hand as a function of a constant characteristic of the value of the standard resistor and of the specific resistance per unit length of the collecting resistor, and on the other hand, from the values of the potential differences determined by said first means.

9. A touch sensitive panel for the entry of information, comprising:
   a first device for locating the unknown position of a specific electrical conductor belonging to a first set of separate conductors of indeterminate resistivities, in which at least a first point of each conductor of said first set of separate conductors is connected to a respective separate point on a first collecting resistor of constant ohmic value per unit length, said first device including:

(a) a standard resistor having an end connected to a point on the first collecting resistor, (b) first means for determining the value of the potential difference appearing between the ends of the first collecting resistor and that appearing between the ends of the first standard resistor when said specific electrical conductor and a second end of said standard resistor are brought to respective potentials of different value from one another, and (c) second means for determining the value of the distance separating said specific conductor of unknown position from an origin point, predefined on the first collecting resistor, on the one hand as a function of a constant characteristic of the value of the standard resistor and of the specific resistance per unit length of the first collecting resistor, and on the other hand, from the values of the potential differences determined by said first means a second device : or locating the unknown position of a specific electrical conductor belonging to a second set of separate conductors of indeterminate resistivities, in which at least a first point of each conductor of said second set of separate conductors is connected to a respective separate point on a second collecting resistor of constant ohmic value per unit length, said second device including:

(d) a standard resistor having an end connected to a point on the second collecting resistor, (e) third means for determining the value of the potential difference appearing between the ends of the second collecting resistor and that appearing between the ends of the standard resistor when said specific electrical conductor and a second end of said standard resistor are brought to respective potentials of different value from one another, and (f) fourth means for determining the value of the distance separating said specific conductor of unknown position from an origin point, predefined on the second collecting resistor, on the one hand as a function of a constant characteristic of the value of the standard resistor and of the specific resistance per unit length of the second collecting resistor, and on the other hand, from the values of the potential differences determined by said third means said first and second devices being carried by an individual substrate for each device, at least one of the substrates being of a flexible and elastic material, the substrates being superpositioned and disposed in such a way that the conductors of each substrate form a group crossing at a spacing the conductors of the other group belonging to the second substrate, each conductor of a group crossing over once and only once all of the conductors of the other group, spacing elements of the substrates maintaining the conductors of each substrate spaced from those of the other substrate in a rest position of the substrate of flexible material, each conductor of this substrate being capable of being brought into contact with at least one conductor of the other substrate by elastic deformation of the flexible substrate caused by a localized pressure exerted on this in the desired region for contact.

10. A panel according to claim 9, said spacing elements being formed by individual rods of one and/or the other substrate, their longitudinal axis being oriented parallel to the conductors of at least one of the devices and the thickness of these rods being less than or equal to their width, itself less than or equal to their length.

11. A panel according to claim 9, comprising a standard resistor common to said first and second devices, this resistor being connected to a point of the collecting resistor of one of said first and second devices.

12. A panel according to claim 11, said standard resistor being connected in series with said collecting resistor.

13. A panel according to claim 12, said ohmic value of the standard resistor being substantially equal to ¼ of the sum of the ohmic values of the collecting resistors of said first and second devices.

14. A panel according to claim 11, said standard resistor of each of said first and second devices being formed by the collecting resistor of the other of said first and second devices.

* * * * *